(12) United States Patent
Perciot et al.

(10) Patent No.: US 9,291,731 B2
(45) Date of Patent: Mar. 22, 2016

(54) NOISE REDUCTION IN PARTICLE MOTION SENSING SEISMIC STREAMER

(75) Inventors: Patrick Perciot, Oslo (NO); Lars Borgen, Sande (NO); Oeyvind Teigen, Oslo (NO); Nicolas Goujon, Oslo (NO)

(73) Assignee: WESTERNGECO L.L.C, Houston, TX (US)

(*) Notice: Subject to any disclaimer, the term of this patent is extended or adjusted under 35 U.S.C. 154(b) by 184 days.

(21) Appl. No.: 12/426,007

(22) Filed: Apr. 17, 2009

(65) Prior Publication Data

US 2009/0296521 A1 Dec. 3, 2009

Related U.S. Application Data (60) Provisional application No. 61/130,216, filed on May 29, 2008.

(51) Int. Cl.
*G01V 1/38* (2006.01)
*G01V 1/20* (2006.01)

(52) U.S. Cl.
CPC ...................... *G01V 1/201* (2013.01)

(58) Field of Classification Search
CPC ..................................... G01V 1/201
USPC ......... 367/25, 18, 20, 149, 151, 154, 176, 24, 367/21; 73/152.46; 174/101.5, 110 F; 340/3 T, 7 R, 8 MM, 8 FT, 9
See application file for complete search history.

(56) References Cited

U.S. PATENT DOCUMENTS

| | | | |
|---|---|---|---|
| 3,434,104 A * | 3/1969 | Buescher et al. | 367/154 |
| 3,744,016 A * | 7/1973 | Davis | 367/154 |
| 3,893,065 A * | 7/1975 | Lea et al. | 367/152 |
| 4,951,265 A * | 8/1990 | Buckles | 367/18 |
| 4,984,218 A * | 1/1991 | Ritter et al. | 367/15 |
| 5,521,885 A * | 5/1996 | Harvey | 367/154 |
| 5,745,436 A * | 4/1998 | Bittleston | 367/20 |
| 6,188,645 B1 * | 2/2001 | Maida et al. | 367/151 |
| 6,477,111 B1 * | 11/2002 | Lunde et al. | 367/20 |
| 7,123,543 B2 | 10/2006 | Vaage et al. | |
| 7,167,413 B1 * | 1/2007 | Rouquette | 367/20 |
| 7,239,577 B2 * | 7/2007 | Tenghamn et al. | 367/15 |
| 7,359,283 B2 | 4/2008 | Vaage et al. | |
| 2005/0194201 A1 | 9/2005 | Tenghamn et al. | |

(Continued)

FOREIGN PATENT DOCUMENTS

| | | |
|---|---|---|
| GB | 2426051 A | 11/2006 |
| WO | WO2004099819 | 11/2004 |
| WO | WO 2004099819 A2 * | 11/2004 |
| WO | WO2005096017 | 10/2005 |
| WO | WO 2005096017 A1 * | 10/2005 |
| WO | 2005121837 | 12/2005 |

OTHER PUBLICATIONS

PCT Search Report, dated Jan. 4, 2010, Application No. PCT/US2009/045064.

(Continued)

*Primary Examiner* — Daniel L Murphy (57) ABSTRACT

An apparatus includes particle motion sensors and a streamer that contains the particle motion sensors. The streamer is to be towed in connection with a seismic survey, and the towing of the streamer produces a turbulent flow. The streamer includes an inner cable that contains the particle motion sensors and a fluid containing layer to surround the inner cable to reduce noise otherwise sensed by the particle motion sensors due to the turbulent flow.

14 Claims, 5 Drawing Sheets

(56) References Cited

U.S. PATENT DOCUMENTS

| | | |
|---|---|---|
| 2005/0195686 A1* | 9/2005 | Vaage et al. .................... 367/21 |
| 2006/0126432 A1* | 6/2006 | Hoogeveen .................... 367/20 |
| 2006/0285435 A1 | 12/2006 | Robertsson |
| 2007/0025182 A1* | 2/2007 | Robertsson .................... 367/18 |
| 2007/0195648 A1 | 8/2007 | Borgen et al. |
| 2008/0008038 A1 | 1/2008 | Robertsson et al. |
| 2008/0316859 A1* | 12/2008 | Welker et al. .................... 367/17 |

OTHER PUBLICATIONS

Search Report of European Patent Application No. 09759025.1 dated Mar. 15, 2012.

Extended European Search Report issued in related EP Application No. 15167245.8 mailed Nov. 26, 2015.

* cited by examiner

NOISE REDUCTION IN PARTICLE MOTION SENSING SEISMIC STREAMER

This application claims the benefit under 35 U.S.C. §119 (e) to U.S. Provisional Patent Application Ser. No. 61/130, 216, entitled, "NOISE REDUCTION IN A PARTICLE MOTION SENSING SEISMIC STREAMER," which was filed on May 29, 2008, and is hereby incorporated by reference in its entirety.

BACKGROUND

The invention generally relates to noise reduction in a particle motion sensing seismic streamer.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, an apparatus includes particle motion sensors and a streamer that contains the particle motion sensors. The streamer is towed in connection with a seismic survey, and the towing of the streamer produces a turbulent flow. The streamer includes an inner cable that contains the particle motion sensors and a fluid containing layer to surround the inner cable to reduce noise otherwise sensed by the particle motion sensors due to the turbulent flow.

In another embodiment of the invention, a technique includes providing particle motion sensors in a streamer to acquire particle motion measurements. The technique includes suppressing noise, which is otherwise present in the particle motion measurements. The suppression of the noise includes surrounding an inner cable that contains the particle motion sensors with a fluid containing layer that moves with the streamer.

In yet another embodiment of the invention, a system that is usable with a well includes a tool that includes a sensor to acquire a downhole measurement. The system includes a fluid layer to reduce noise that is otherwise sensed by the sensor due to a turbulent flow about the tool.

Advantages and other features of the invention will become apparent from the following drawing, description and claims.

DETAILED DESCRIPTION

Figure 1:
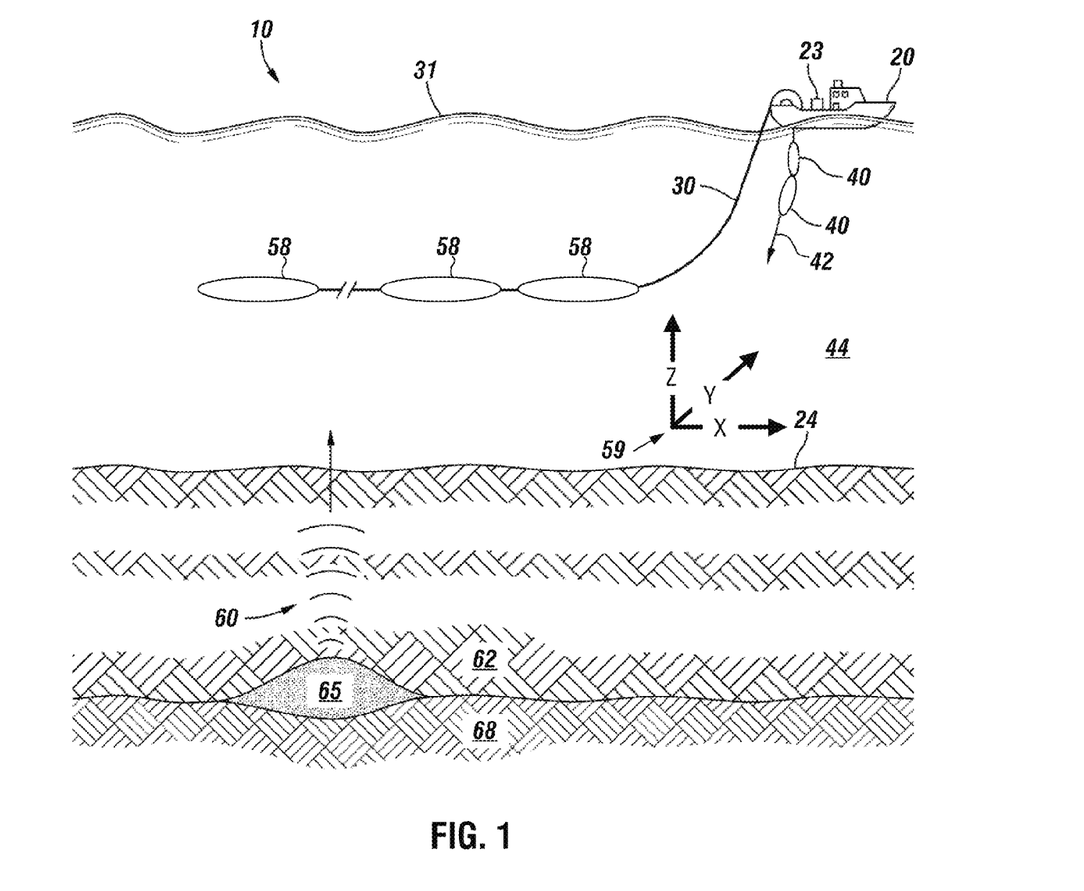
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more particle motion sensing seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each particle motion sensing seismic streamer 30 includes seismic sensors 58, which include particle motion sensors as well as hydrophones to acquire pressure data. In some embodiments of the invention, the seismic sensors 58 may be multi-component sensors, with each sensor being capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the hydrophones may be embedded in the core (inner cable) of the streamer, mounted in a recession of the inner cable, or disposed in the fluid layer, as just a few non-limiting examples.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 provides one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

Particle motion sensors are subject to relatively high noise levels, especially at low frequencies. A portion of this noise is attributable to vibration of the cable due to the pressure fluctuations and forces, including shear forces, applied to the outer surface of the streamer that are generated by a turbulent flow in a boundary layer that exists between the outer surface of the streamer 30 and the water through which the streamer 30 is towed. More specifically, referring to FIG. 2 (which depicts an exemplary segment of a streamer 30), a streamer 30 in accordance with embodiments of the invention may be towed through the water, which creates turbulences 112 in a boundary layer that surrounds the outer skin of the streamer 30. These turbulences will create pressure fluctuations and apply forces to the outer surface of the streamer, which excite vibrations (longitudinal, transversal and torsional) in the streamer. As depicted in the corresponding absolute velocity profile 115 (depicting the velocity relative to the ambient water), the velocity of the water decreases with the distance away from the outer surface of the streamer 30.

Figure 2:
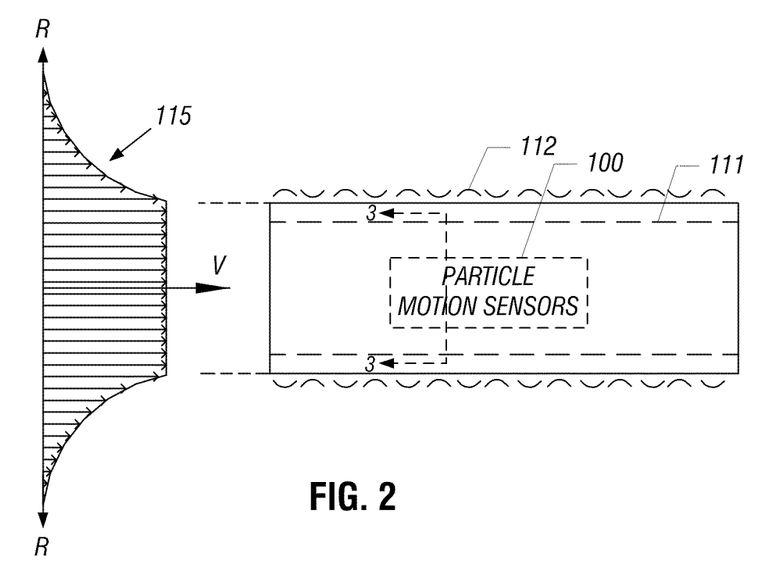
FIGS. 2, 4 and 5 depict partial schematic diagrams of a streamer in accordance with embodiments of the invention.

The turbulences 112, because they generate vibration in the cable, are potential noise sources that may adversely affect the quality of the measurements that are acquired by particle motion sensors 100 of the streamer 30. The particle motion sensors 100 may be contained in an inner cable 111 of the streamer 30. Depending on the particular embodiment of the invention, the particle motion sensors may be particle motion sensing components of multi-component sensors or may be stand alone sensors.

The elastic wave speed in a fluid is high due to the relatively high bulk modulus of the fluid. This characteristic is used, in accordance with embodiments of the invention described herein, to average the turbulences 112, which will then limit the vibration of the core caused by these turbulences 112, and therefore limit the noise recorded by the particle motion sensor. More specifically, as described herein, the streamer 30 has a fluid containing layer that sums the positive amplitude pressure pulses with the negative amplitude pressure pulses to provide resulting smaller total pressure amplitude(s), such that the excitation of vibration is smaller, which is sensed as noise by the particle motion measurements. As a result, the fluid averaging limits flow noise pick-up for the particle motion measurements.

As a more specific example, in accordance with embodiments of the invention, the streamer 30 has a fluid containing layer that moves with the sensitive inner cable 111 and surrounds the cable 111. Because the fluid containing layer is moving together with the inner cable 111 as the streamer 30 is towed, there is no relative inline flow movement between the fluid within the fluid containing layer and the sensitive part of the inner cable 111. Due to this arrangement, the fluid containing layer averages the pressure fluctuations 112 and greatly reduces inner cable vibration to suppress noise that is otherwise sensed by the particle motion sensors 100.

The forces, including the shear forces, generated by the turbulences 112 are applied to the outer skin of the streamer 30. As the outer skin is disconnected from the inner cable by the fluid layer, only substantially small (if any) components of these forces are transmitted to the inner cable. As the level of vibration excitation from these forces is greatly reduced on the inner cable, the level of vibration noise is also greatly reduced.

Figure 3:
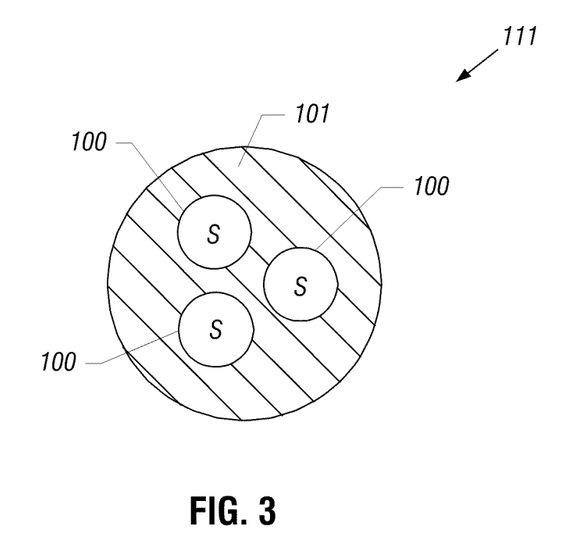
FIG. 3 is a cross-sectional view taken along line 3-3 of FIG. 2 according to an embodiment of the invention.

Referring to FIG. 3, in accordance with some embodiments of the invention, the inner cable 111 is a solid core cable, which contains various particle motion sensors, such as the exemplary particle motion sensors 100 that are depicted in FIG. 3. The inner cable 111 may include various other elements that are not depicted in FIG. 3, such as stress members, electrical cables, fiber optic cables and so forth. Additionally, in accordance with embodiments of the invention, the inner cable 111 may include other types of seismic sensors, such as hydrophones.

In accordance with some embodiments of the invention, the particle motion sensors 100 are embedded in a core material 101, such as a thermoplastic material, which is either extruded or injection molded into a cable core. It is noted that the inner cable 111 depicted in FIG. 3 is merely an example of one out of many possible embodiments of an inner cable that contains particle motion sensors. Thus, many variations are contemplated and are within the scope of the appended claims.

For example, in other embodiments of the invention, the components of the inner cable 111, such as the particle motion sensors 100, may be contained within a tubing (a polyurethane tubing, as a non-limiting example) which forms the outer layer of the cable. The inner space of the tubing may be filled with a plastic-type injection filling, such as polyurethane, in accordance with some embodiments of the invention. The cable core may also be a gel-filled streamer, in accordance with other embodiments of the invention.

Figure 4:
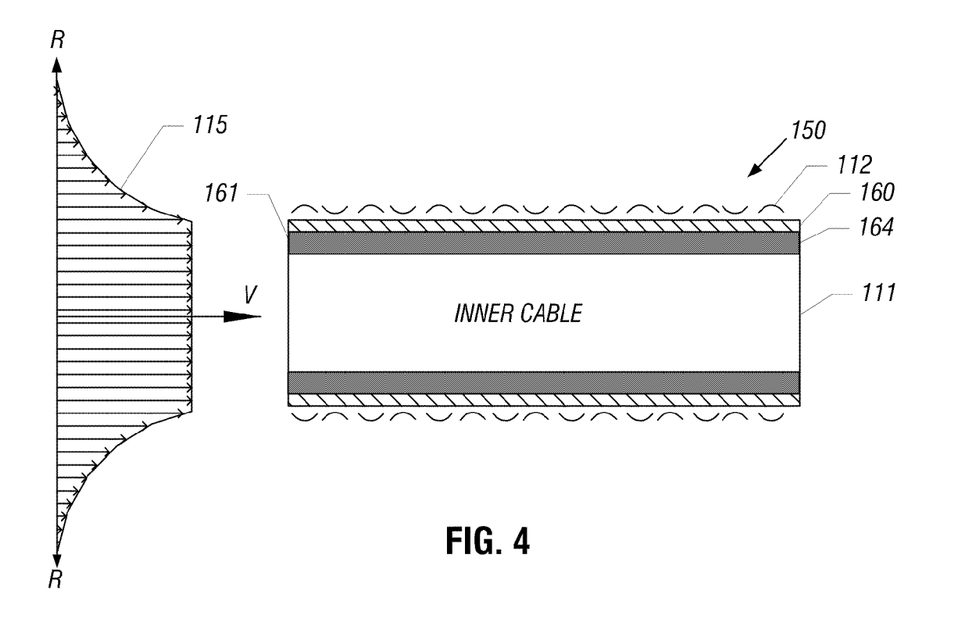

Turning now to more detailed examples of streamers that have fluid containing layers, FIG. 4 depicts a streamer 150 in accordance with some embodiments of the invention. The streamer 150 has a fluid containing layer 164, which is formed in an annular space between the inner cable 111 and the streamer's outer skin 160. As an example, the fluid containing layer 164 may contain a buoyant and non-reactive fluid, such as water; and in general, the density of the fluid may be selected to be near the density of the inner cable 111, in accordance with some embodiments of the invention. In accordance with some embodiments of the invention, water is neutrally buoyant and may be the preferred fluid. In general, the density of the fluid should be sufficiently close to the density of the inner cable to assure stability of the fluid layer. As the streamer as a whole should be neutrally buoyant, the inner cable and the fluid has a density close to sea water in accordance with some embodiments of the invention. It is noted that the fluid containing layer 164 may contain a fluid other than water (kerosene, for example) in accordance with other embodiments of the invention. Furthermore, as is the case for water, which is neutrally buoyant, the fluid of the fluid containing layer 164 does not necessarily have to be buoyant, as the overall buoyancy of the streamer 150 may be adjusted by the inner cable's buoyancy.

In addition to a fluid, the fluid containing layer 164 may contain an open cell, or sponge-like, material 161 that is saturated with the fluid, in accordance with some embodiments of the invention. The material 161 prevents the outer skin 160 from contacting the inner cable 111, a contact which may introduce noise, and dampen the propagation of waves in the skin/fluid layer.

The fluid containing layer 164 radially extends between the exterior surface of the inner cable 111 and the inner surface of an outer skin 160 of the streamer 150, in accordance with some embodiments of the invention. In accordance with some embodiments of the invention, the outer skin 160 may be formed from a material (polyurethane, for example) that seals off the fluid containing layer 164 from the external environment of the streamer 150. The fluid containing layer 164 averages the pressure fluctuations and forces generated by the turbulences 112 that are present external to the outer skin 160. This averaging, in turn, lowers the amplitudes of the pressure fluctuations and forces and thus, suppresses, or attenuates, the vibration of the inner cable that is otherwise sensed as noise by the particle motion sensors of the inner cable 111. Therefore, the vibration caused by the turbulences that are "seen" by the sensitive part of the inner cable 111 are relatively low, and as a result, the particle motion sensors experience lower noise levels. This averaging effect reduces the noise levels by minimizing the excitations for the cable vibrations The outer skin 160, in a preferred embodiment, can be terminated at the connectors of streamer 150. For practical reasons, as mechanical robustness during deployment and recovery of the streamer, it might be beneficial to fix the outer skin to the inner core at some locations along the streamer. This can be done for example by clamping the outer skin to the inner core; or the outer skin can be glued or welded to the inner core, for example on protrusions of the inner core to keep the outer diameter constant.

It is noted that the fluid containing layer 164 does not significantly reduce signal sensitivity for embodiments in which the bulk modulus of the inner cable 111 and the bulk modulus of the fluid containing layer 164 are significantly high. Therefore, the net effect is an increased signal-to-noise ratio (SNR) for the particle motion measurements.

Figure 5:
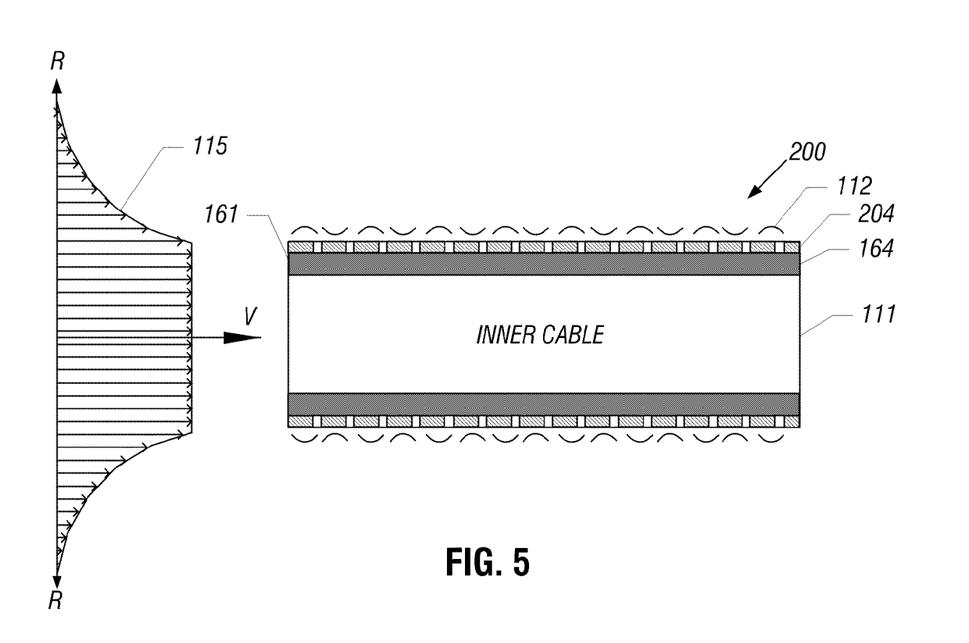

Referring to FIG. 5, in accordance with other embodiments of the invention, a streamer 200 may be used in place of the streamer 150 (see FIG. 4). Similar reference numerals are used in FIG. 5 to denote similar components that are discussed above. Unlike the streamer 150 (FIG. 4), the streamer 200 includes an outer skin 204, which replaces the outer skin 160 of the streamer 150 (see FIG. 4) and allows fluid communication between the fluid containing layer 160 and the environment outside of the streamer 200. As examples, the outer skin 204 may be perforated skin or a net. Through the "open" outer skin 204, the fluid containing layer 164 is exposed to the surrounding marine environment of the streamer 200 and thus, the fluid containing layer 164 is configured to receive water from this environment. Due to its open cell or sponge-like design, the material 161 is constructed to retain water during the towed marine seismic survey to form a fluid averaging layer. Thus, when the streamer 200 is subject to surrounding water, the cells of the material 161 fill up with the water, and the retained fluid volume in the material 161 travels together with the streamer 200 and inner cable 111 in the towing direction.

Because the fluid in the cells is stationary relative to the inner cable 111, there is no turbulence or local flow effects, which occur on the outer surface of the inner cable 111. The pressure fluctuations 112 that are outside of the material 161 are averaged within the fluid in the cells of the material 161, and as a result, the pressure and force fluctuations that cause vibration of the sensitive part of the inner cable 111 are reduced, as compared to a streamer that does not contain a fluid containing layer.

Figure 6:
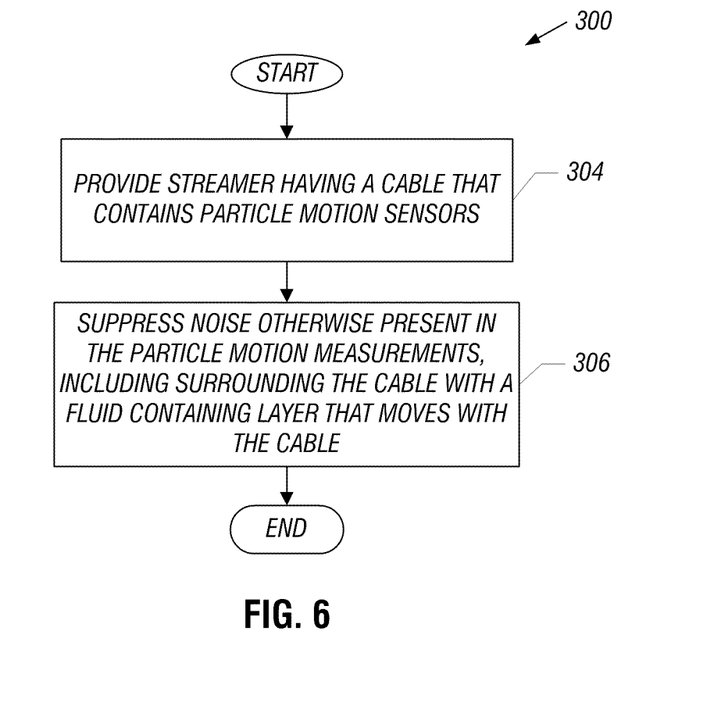
FIG. 6 is a flow diagram depicting a technique to reduce noise acquired by particle motion sensors according to an embodiment of the invention.

Referring to FIG. 6, to summarize, a technique 300 may be used for purposes of reducing noise caused by a turbulent boundary acting on a towed seismic streamer. The technique 300 includes providing a streamer that has a cable that contains particle motion sensors, pursuant to block 304. Pursuant to block 306, noise that is otherwise present in the particle motion measurements is suppressed by a fluid containing layer that surrounds and moves with the cable.

Figure 7:
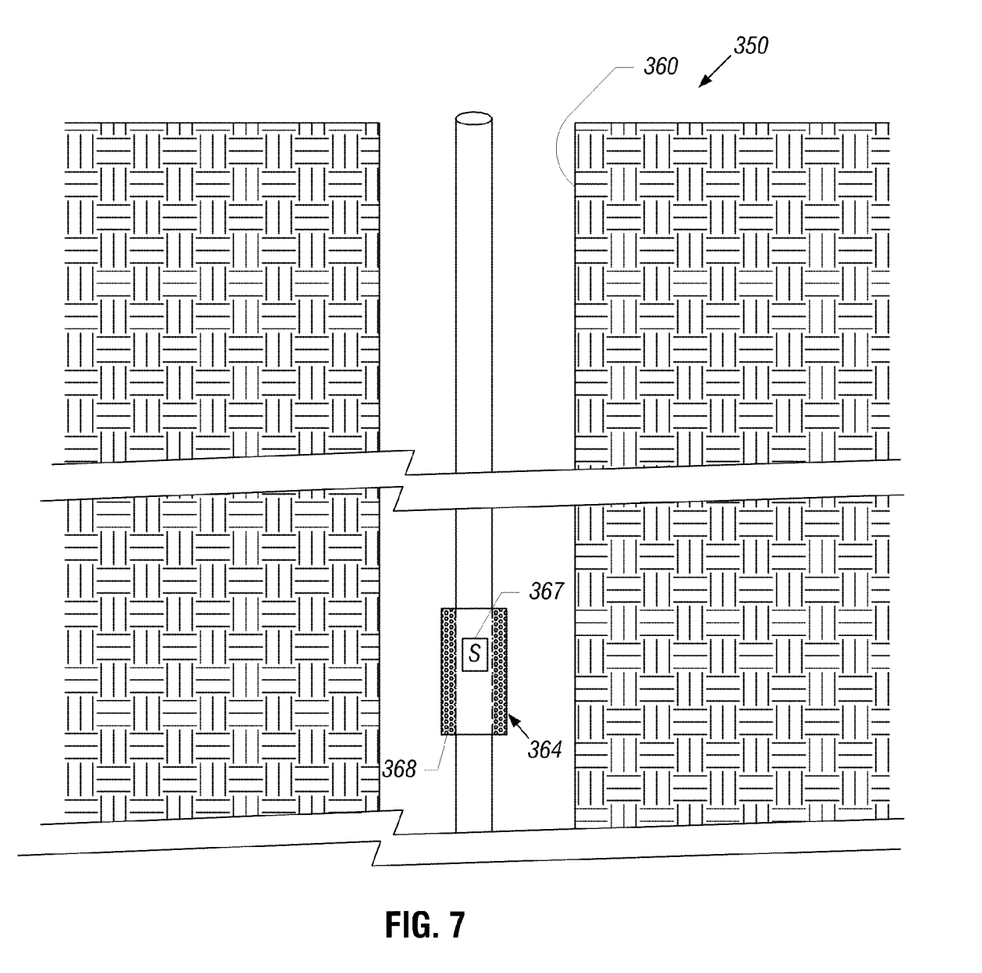
FIG. 7 is a cross-sectional view of a well according to an embodiment of the invention.

Other embodiments are contemplated and are within the scope of the appended claims. For example, referring to FIG. 7, in accordance with other embodiments of the invention, a tool 364 may be used in a borehole application in a well 350 and may contain features that reduce noise. In this regard, the tool 364 may be, as a non-limiting example, a sensor-based tool, that includes a sensor 367, such as an electromagnetic (EM) coil, geophone, etc. As also depicted in FIG. 7, as a non-limiting example, the tool 364 may be conveyed downhole into a wellbore 360 via a string 362 or other conveyance mechanism.

The tool 364 may be run into the wellbore 360 in a variety of applications, such as applications involved with the testing, drilling, completion or production phases of the well. Regardless of the particular use of the tool experience a flow in the well, such as a flow of oil, water, drilling mud, etc., which causes vibration of the tool 364. This vibration may cause noise to be introduced into the measurements that are acquired by the sensor 367. However, unlike conventional arrangements, the tool 364 contains an outer fluid layer 368 that reduces the vibration of the sensor 364, lowers the noise that is introduced into the sensor's measurements and generally improves the signal-to-noise ratio (SNR) of the measurements.

It is noted that the well 350 may be a subsea or subterranean well, depending on the particular embodiment of the invention. Additionally, the wellbore 360 may be a vertical or lateral wellbore; and the wellbore 360 may be uncased or cased. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A seismic streamer comprising:
   pressure sensors;
   particle motion sensors;
   a solid core inner cable and an outer skin surrounding the solid core inner cable; and
   a fluid containing layer between the outer skin and the solid core inner cable,
   wherein at least one of the particle motion sensors is connected with the seismic streamer such that the at least one particle motion sensor is static with respect to the solid core inner cable.

2. The seismic streamer of claim 1, wherein the fluid containing layer comprises kerosene.

3. The seismic streamer of claim 1, wherein the solid core inner cable includes a stress member.

4. The seismic streamer of claim 1, wherein the particle motion sensors are contained in the solid core inner cable.

5. The seismic streamer of claim 1, wherein the particle motion sensors are embedded in the solid core inner cable.

6. The seismic streamer of claim 5, wherein the pressure sensors are pressure gradient sensors.

7. The seismic streamer of claim 1, wherein the particle motion sensors are accelerometers.

8. The seismic streamer of claim 1, wherein the pressure sensors are hydrophones.

9. The seismic streamer of claim 1, wherein the particle motion sensors and the pressure sensors are embedded in the solid core inner cable.

10. The seismic streamer of claim 1, further comprising:
    a survey vessel to tow the streamer.

11. The seismic streamer of claim 1, wherein the solid inner core cable is primarily formed from an injection molded material, and the at least one sensor is embedded in the injection molded material.

12. The seismic streamer of claim 1, wherein the solid core inner cable is primarily formed from an extruded material, and the at least one sensor is embedded in the extruded material.

13. The seismic streamer of claim 1, wherein the solid core inner cable comprises a plastic.

14. The seismic streamer of claim 1, wherein at least one of the particle motion sensors has multiple axes of sensitivity to particle motion.

\* \* \* \* \*